US012796717B2

(12) United States Patent
Wang et al.

(10) Patent No.: US 12,796,717 B2
(45) Date of Patent: Nov. 17, 2026

(54) PRESERVATION METHOD FOR FRESH WET RICE NOODLES OR FRESH WET BROWN RICE NOODLES

(71) Applicant: Jiangnan University, Wuxi (CN)

(72) Inventors: Li Wang, Wuxi (CN); Congnan Zhang, Wuxi (CN); Haipeng Hu, Wuxi (CN); Wei Xue, Wuxi (CN); Ting Li, Wuxi (CN); Xinxia Zhang, Wuxi (CN)

(73) Assignee: Jiangnan University, Wuxi (CN)

( * ) Notice: Subject to any disclaimer, the term of this patent is extended or adjusted under 35 U.S.C. 154(b) by 491 days.

(21) Appl. No.: 18/367,525

(22) Filed: Sep. 13, 2023

(65) Prior Publication Data

US 2023/0413870 A1 Dec. 28, 2023

(30) Foreign Application Priority Data

Jul. 14, 2022 (CN) ........................ 202210831080.X

(51) Int. Cl.

| | |
|---|---|
| ***A23L 7/109*** | (2016.01) |
| ***A23B 9/02*** | (2006.01) |
| ***A23B 9/26*** | (2006.01) |
| ***A23B 9/32*** | (2006.01) |

(52) U.S. Cl.

CPC ................ *A23L 7/109* (2016.08); *A23B 9/02* (2013.01); *A23B 9/26* (2013.01); *A23B 9/32* (2013.01)

(58) Field of Classification Search

None

See application file for complete search history.

(56) References Cited

U.S. PATENT DOCUMENTS 6,180,148 B1 * 1/2001 Yajima .................... A23L 7/111 426/392
2020/0245654 A1 * 8/2020 Zhu ......................... A23L 7/111

FOREIGN PATENT DOCUMENTS

| | | |
|---|---|---|
| CN | 108936284 | * 12/2018 |
| CN | 111887378 | * 11/2020 |
| CN | 114365819 | * 4/2022 |
| JP | 2010011756 | * 1/2010 |
| KR | 20140073749 | * 6/2014 |
| KR | 101912895 | * 10/2018 |
| KR | 101991426 | * 6/2019 |

* cited by examiner

*Primary Examiner* — Lien T Tran

(74) *Attorney, Agent, or Firm* — IPro, PLLC; Na Xu

(57) ABSTRACT

Disclosed is a preservation method for fresh wet rice noodles or fresh wet brown rice noodles, belonging to the technical field of food. According to the present disclosure, ε-polylysine hydrochloride, pyrophosphate, glycerol, sodium chloride, a highly water-soluble starch-dextrin complex, rice flour and water are mixed together, and the obtained mixture is stirred evenly to obtain a mixed system; and extrusion forming, first-stage aging, re-steaming, second-stage aging and rehydration are performed on the mixed system to obtain the fresh wet rice noodles or fresh wet brown rice noodles. Furthermore, the present disclosure employs a combination of thermodynamic sterilization and chemical preservation to preserve the fresh wet rice noodles, thereby prolonging the shelf life of the fresh wet rice noodles or fresh wet brown rice noodles to 2 months or more and keeping the quality thereof good.

6 Claims, 3 Drawing Sheets

PRESERVATION METHOD FOR FRESH WET RICE NOODLES OR FRESH WET BROWN RICE NOODLES

TECHNICAL FIELD

The present disclosure relates to a preservation method for fresh wet rice noodles or fresh wet brown rice noodles, belonging to the technical field of food.

BACKGROUND

Rice noodles, also known as noodles made of rice, rice flour noodles or rice vermicelli, are strip-shaped rice products with rice as the main raw material. At present, the more recognized classification methods are based on different production processes, including pressing noodles (extrusion forming) and cutting noodles (cutting forming). Dried rice noodles can be stored for a longer time, but some of the flavor of the dried rice noodles will be lost, and they need to be rehydrated when being consumed. As a result, the nutrition, convenience, taste and flavor of the dried rice noodles are not as good as those of fresh wet rice noodles. The fresh wet rice noodles are easy to digest, convenient and fast to consume, and smooth in taste, which is in line with people's dietary habits, thus being loved by broad consumers. However, as a food with high water content and high starch base, the fresh wet rice noodles are prone to microbial spoilage and have a shelf life of less than 1 day at room temperature, which seriously restricts the sales and circulation of the product. For the fresh wet rice noodles, too high temperature and pressure cannot be used to prevent them from sticking together, and will deteriorate their quality. Generally, cooking sterilization is carried out under the normal pressure, but the sterilization effect cannot be achieved when the sterilization temperature and sterilization time are reduced.

At present, there is no good preservation method for the fresh wet rice noodles (fresh wet brown rice noodles), and the short storage time and poor storage quality seriously restrict the development of the industry of the fresh wet rice noodles or fresh wet brown rice noodles. In addition, as a typical high-moisture and high-starch-based food system, the fresh wet rice noodles suffer from serious water loss during storage and are prone to long-term aging. The recrystallization of amylopectin results in the formation of highly crystalline bodies that are difficult to rehydrate, which causes the fresh wet rice noodles to lose their luster, weakens their viscoelasticity, hardens their taste, significantly decreases their edible quality, and seriously affects the storage period of the fresh wet rice noodles. In addition, most of the current preservation technologies only focus on broad-spectrum preservation, and cannot achieve precision in targeting the fresh wet rice noodles.

SUMMARY

In order to solve the above-mentioned problem that the fresh wet rice noodles or fresh wet brown rice noodles are difficult to preserve, the present disclosure provides a preservation method for fresh wet rice noodles or fresh wet brown rice noodles, the method includes:

mixing ε-polylysine hydrochloride, pyrophosphate, glycerol, sodium chloride, a highly water-soluble starch-dextrin complex, rice flour and water, and evenly stirring to obtain a mixed system, where the rice flour includes white rice flour or brown rice flour; performing extrusion forming, first-stage aging, re-steaming, second-stage aging and rehydration on the mixed system to obtain the fresh wet rice noodles or fresh wet brown rice noodles;

the amounts of the ε-polylysine hydrochloride, the pyrophosphate, the glycerol, the sodium chloride, and the highly water-soluble starch-dextrin complex being respectively 0.1-0.2 g/kg, 0-3 g/kg, 0-1 g/kg, 2-3 g/kg, and 5-120 g/kg of the weight of the rice flour; and a preparation method of the highly water-soluble starch-dextrin complex including:

mixing corn starch with water in a ratio of 1:1.3 to 1:1.6, adding lactic acid to adjust the pH to 2.5 to 3.5, continuously stirring for 30 min, carrying out suction filtration on most of the water and then placing the product in an oven at 40 °C to reduce the water content to 5%, and continuing to bake at 180 °C for 3-5 h to prepare the highly water-soluble starch-dextrin complex.

In one embodiment of the present disclosure, the amount of the water is 200-300 g/kg of the weight of the rice flour.

In one embodiment of the present disclosure, the amount of the pyrophosphate is preferably 2-3 g/kg of the weight of the rice flour; and the amount of the glycerol is preferably 0.5-1 g/kg of the weight of the rice flour.

In one embodiment of the present disclosure, the solubility of the highly water-soluble starch-dextrin complex is higher than 95%, the molecular weight thereof is $2.5\times10^5$ to $3.5\times10^5$ g/mol, and the viscosity thereof is 40-50 mPa·s.

In one embodiment of the present disclosure, the amount of the highly water-soluble starch-dextrin complex relative to the rice flour is preferably 30-120 g/kg, more preferably 30-90 g/kg, and still more preferably 30-60 g/kg.

In one embodiment of the present disclosure, the re-steaming temperature is 90-100 °C, and the re-steaming time is 10-15 min.

In one embodiment of the present disclosure, the water temperature during rehydration is 80-85 °C, the rehydration time is 3-5 min, and the water content in the rehydrated brown rice noodles is 60-65%.

In one embodiment of the present disclosure, the method further includes soaking the fresh wet rice noodles or fresh wet brown rice noodles in a preservation solution and then bagging them, spraying an edible ethanol solution inside a packaging bag, and then exhausting the air in the bag and sealing.

In one embodiment of the present disclosure, the method further includes thermodynamically sterilizing the packaged fresh wet rice noodles or fresh wet brown rice noodles, then soaking same in cold water for a period of time, and checking whether the packaging bag is subjected to air leakage or not.

In one embodiment of the present disclosure, the preservation solution is a lactic acid/sodium lactate compound solution, where the mass concentration of lactic acid is 1%-2%, and the mass concentration of sodium lactate is 1%.

In one embodiment of the present disclosure, the soaking time of the fresh wet rice noodles or fresh wet brown rice noodles in the preservation solution is 2-3 min, the packaging bag is a food-grade PE packaging bag, and the packaging size of the rice noodles bag is 200-300 g/bag.

In one embodiment of the present disclosure, the mass concentration of edible ethanol is 65%-85%, and the amount of the ethanol solution sprayed per bag is 5-6 mL.

In one embodiment of the present disclosure, the thermodynamic sterilization temperature is 75-85 °C, and the sterilization time is 10-15 min.

Beneficial Effects of the Present Disclosure

1. The present disclosure adopts a physical-chemical combined preservation method to prolong the shelf life of the fresh wet rice noodles (or fresh wet brown rice noodles) to 2 months or more and keep the quality thereof good.
2. The low-dose preservation, i.e., a fence preservation technology reduces the treatment intensity of all preservation processes, significantly reduces the amount of the ethanol solution utilization and the acid concentration in the preservation solution without bringing adverse flavors, and even improves the flavor of the rice noodles to a certain extent.
3. The home-made highly water-soluble starch-dextrin complex of the present disclosure compounded with the pyrophosphate, the glycerol and the sodium chloride can significantly inhibit the starch retrogradation and aging of the fresh wet rice noodles, which significantly reduces the water loss, breaking and hardening of the rice noodles during storage.
4. The present disclosure is low in preservation cost, safe and reliable, simple in process, and high in feasibility of industrialization.
5. The rice noodles have good water retention performance and anti-aging performance.

DETAILED DESCRIPTION

Figure 1:
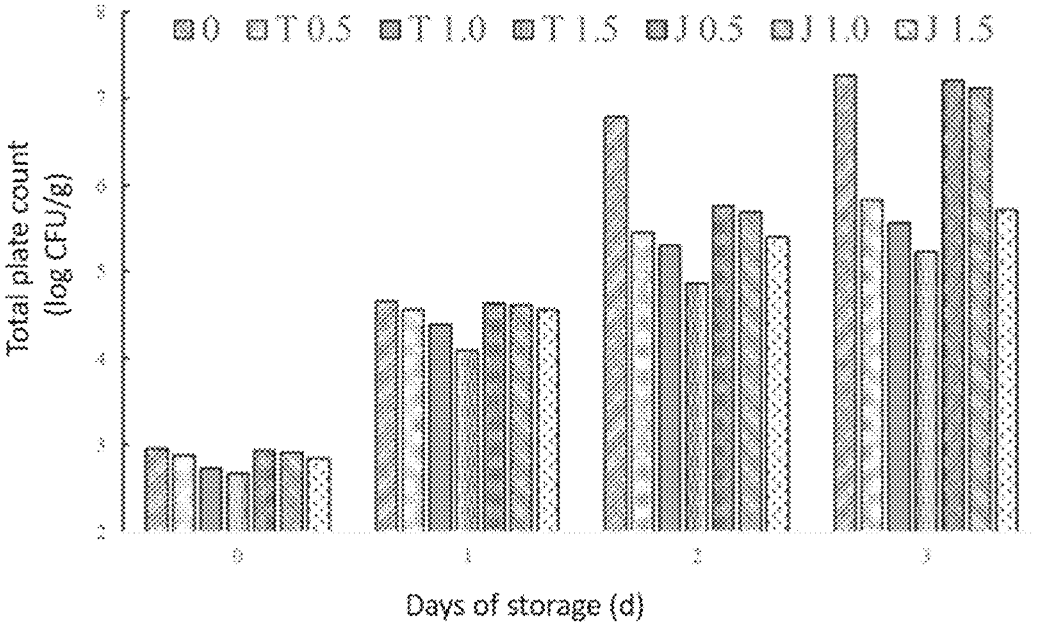
FIG. 1 is a comparison diagram of the effect of an adding process and a soaking process on the total number of colonies of fresh wet rice noodles (or fresh wet brown rice noodles), where T denotes adding, and J denotes soaking.

In order to clarify the purpose, technical solution, and advantages of the present disclosure, the embodiments of the present disclosure will be described in further detail below.

Detection Method (1) The determination of the total number of bacterial colonies refers to GB 4789.2-2016.

(2) The determination of the numbers of mold and yeast colonies refers to GB 4789.15-2016.

(3) Hardness: The texture quality of fresh wet rice noodles (or fresh wet brown rice noodles) is tested by a TA-XT2i physical property tester. The rice noodles are cooked and then taken out, cooled for 10 s in 600 mL of distilled water, and then drained off. 3 rice noodles are used for each texture quality determination. The specific determination conditions are as follows: total texture (TPA): a P/35 probe is selected, the compression ratio is 50%, the test speed is 1 mm/s, and the touch force is 5 g.

(4) Water loss rate (%): The determination of water content refers to Determination of Moisture in Food of GB 5009.3-2016, and the waster loss rate (%)=(original water content—water content at the time of detection)/original water content×100.

(5) Breaking rate: Determination of breaking rate: 30 rice noodles which have the lengths of 20 cm and are not subjected to mechanical damage are taken, heated and cooked in 1 L of boiling water until the optimum cooking time, and then taken out; and the total number of the rice noodles is recorded.

$$D\% = \frac{N-30}{30} \times 100$$

in the formula, D denotes breaking rate (%); and

N denotes the total number of rice noodles cooked according to the optimum cooking time.

The white rice flour or brown rice flour involved in the present disclosure is processed by conventional techniques such as soaking rice, draining water, and pulverizing.

The highly water-soluble starch-dextrin complexes involved in the following examples are all prepared by mixing corn starch with water in a mass ratio of 1:1.5, adding lactic acid to adjust the pH to 3.0, continuously stirring for 30 min, carrying out suction filtration on most of the water and then placing the product in an oven at 40 °C to reduce the water content to 5%, and continuing to bake at 180 °C for 3-5 h to prepare the highly water-soluble starch-dextrin complex. The obtained highly water-soluble starch-dextrin complex have the following characteristics: the water solubility is high, and the solubility is higher than 95%; and the molecular weight is as low as $2.5\times10^5$ to $3.5\times10^5$ g/mol, and the viscosity is 40-50 mPa·s.

In addition, water is the most abundant component in fresh wet rice noodles (or fresh wet brown rice noodles), accounting for 45% to 75% of the mass of the fresh wet rice noodles (or fresh wet brown rice noodles). The water plays a key role in the processing and storage of food, and has a great impact on the internal structure, appearance and storage stability of food. The growth, reproduction and physiological metabolism of microorganisms are closely related to water activity, and the fresh wet rice noodles (or fresh wet brown rice noodles) have higher water activity because of their higher water content. When the water activity reaches 0.80, mold starts to reproduce; when the water activity is greater than 0.87, yeast starts to reproduce; and bacteria can only grow and reproduce when the water activity is greater than 0.9. Therefore, adjusting the water state and water activity is also a key step to inhibit the quality deterioration of the fresh wet rice noodles (or fresh wet brown rice noodles). Pyrophosphate, glycerol, and sodium chloride can not only reduce the water activity, but also inhibit microbial reproduction. Furthermore, the highly water-soluble starch-dextrin complex can also play a role in water retention, thus preventing water loss, and inhibiting the aging and hardening of the rice noodles during storage. In this method, the fresh wet rice noodles (or fresh wet brown rice noodles) are preserved by means of a combination of thermodynamic sterilization and chemical preservation.

Example 1

This example provides a preservation method for fresh wet rice noodles, the method includes:

in the actual production process, the following steps were included:

(1) ε-polylysine hydrochloride, pyrophosphate, glycerol, sodium chloride, a highly water-soluble starch-dextrin complex and water were mixed with white rice flour, and the mixture was evenly stirred, where the amounts of the ε-polylysine hydrochloride, the pyrophosphate, the glycerol, the sodium chloride, the highly water-soluble starch-dextrin complex, and the water were respectively 0.1 g/kg, 2 g/kg, 0.5 g/kg, 3 g/kg, 30 g/kg, and 250 g/kg of the weight of the white rice flour, so that a mixed material was obtained;

(2) extrusion forming, first-stage aging, re-steaming, second-stage aging and rehydration were performed on the mixed material to obtain the fresh wet rice noodles, where the extrusion forming: the gelatinization temperature of a twin-screw extruder was set to be 95 °C, the temperature of a feed inlet was set to be 50 °C, the mixed material was slowly poured into the twin-screw extruder and subjected to extrusion forming after the twin-screw extruder ran stably, and then the rice noodles were collected;

first-stage aging: the rice noodles extruded by the twin-screw extruder were blown to be cool and then hung on a stainless-steel shelf, put into a constant temperature and humidity incubator with the temperature and humidity being respectively 50 °C and 95%, and aged for 1 h;

re-steaming: the re-steaming temperature was 100 °C, and the re-steaming time was 15 min;

second-stage aging: the re-steamed rice noodles were taken out, put into the constant temperature and humidity incubator with the temperature and humidity being respectively 50 °C and 95% again, and aged for 5 h;

rehydration: the rice noodles subjected to the second-stage aging were trimmed to a length of 25 cm, the rehydration temperature was 85 °C, the rehydration time was 4 min, and the water content of the brown rice noodles after rehydration was 57%;

(3) the fresh wet rice noodles were soaked in a pickling solution (prepared by dispersing lactic acid and sodium lactate in water) and then bagged, where the mass concentration of the lactic acid in the pickling solution was 1%, the mass concentration of the sodium lactate in the pickling solution was 1%, and the pickling time was 2 min; at the same time, 5 mL of 65% edible ethanol solution was sprayed inside a packaging bag, and then the air in the bag was exhausted and the bag was sealed; and (4) the bagged fresh wet rice noodles were thermodynamically sterilized for 15 min at and then put in cold water for cooling, and whether the packaging bag was subjected to air leakage or not was checked.

The preparation of the highly water-soluble starch-dextrin complex: corn starch was mixed with water in a mass ratio of 1:1.5, lactic acid was added to adjust the pH to 3.0, the mixture was continuously stirred for 30 min, suction filtration was carried out on most of the water, the product was then placed in an oven at 40 °C to reduce the water content to 5%, and baking was continued at 180 °C for 4 h, so that the highly water-soluble starch-dextrin complex was prepared.

The obtained highly water-soluble starch-dextrin complex had the following characteristics: the water solubility was high, and the solubility was 98%; and the molecular weight was as low as $3\times10^5$ g/mol, and the viscosity was 45 mPa·s.

Example 2

The example provides a preservation method for fresh wet brown rice noodles, the method includes:

(1) ε-polylysine hydrochloride, pyrophosphate, glycerol, sodium chloride, a highly water-soluble starch-dextrin complex and water were mixed with brown rice flour, and the mixture was evenly stirred, where the amounts of the ε-polylysine hydrochloride, the pyrophosphate, the glycerol, the sodium chloride, the highly water-soluble starch-dextrin complex, and the water were respectively 0.15 g/kg, 2.5 g/kg, 0.5 g/kg, 2.5 g/kg, 30 g/kg, and 250 g/kg of the weight of the brown rice flour, so that a mixed material was obtained;

(2) extrusion forming, first-stage aging, re-steaming, second-stage aging and rehydration were performed on the mixed material to obtain the fresh wet brown rice noodles, where the extrusion forming: the gelatinization temperature of a twin-screw extruder was set to be 95 °C, the temperature of a feed inlet was set to be 50 °C, the mixed material was slowly poured into the twin-screw extruder and subjected to extrusion forming after the twin-screw extruder ran stably, and then the rice noodles were collected;

first-stage aging: the rice noodles were put into a constant temperature and humidity incubator with the temperature and humidity being respectively 50 °C and 98%, and aged for 1 h;

re-steaming: the re-steaming temperature was 100 °C, and the re-steaming time was 15 min;

second-stage aging: the re-steamed rice noodles were taken out, put into the constant temperature and humidity incubator with the temperature and humidity being respectively 50 °C and 98% again, and aged for 5 h;

rehydration: the rice noodles subjected to the second-stage aging were trimmed to a length of 25 cm, the rehydration temperature was 85 °C, the rehydration time was 4 min, and the water content of the rice noodles after rehydration was 57%;

(3) the fresh wet brown rice noodles were soaked in a pickling solution (prepared by dispersing lactic acid and sodium lactate in water) and then bagged, where the mass concentration of the lactic acid in the pickling solution was 1.5%, the mass concentration of the sodium lactate in the pickling solution was 1%, and the pickling time was 2 min; at the same time, 5 mL of 75% edible ethanol solution was sprayed inside a packaging bag, and then the air in the bag was exhausted and the bag was sealed;

(4) the bagged fresh wet brown rice noodles were thermodynamically sterilized for 10 min at 80 °C and then put in cold water for cooling, and whether the packaging bag was subjected to air leakage or not was checked.

The preparation of the highly water-soluble starch-dextrin complex was the same as that in Example 1.

Example 3

The example provides a production method for fresh wet brown rice noodles, the method includes:

(1) ε-polylysine hydrochloride, pyrophosphate, glycerol, sodium chloride, a highly water-soluble starch-dextrin complex and water were mixed with brown rice flour, and the mixture was evenly stirred, where the amounts of the ε-polylysine hydrochloride, the pyrophosphate, the glycerol, the sodium chloride, the highly water-soluble starch-dextrin complex, and the water were respectively 0.2 g/kg, 2.5 g/kg, 0.75 g/kg, 2 g/kg, 30 g/kg, and 250 g/kg of the weight of the brown rice flour, so that a mixed material was obtained;

(2) extrusion forming, first-stage aging, re-steaming, second-stage aging and rehydration were performed on the mixed material to obtain the fresh wet brown rice noodles, where the extrusion forming: the gelatinization temperature of a twin-screw extruder was set to be 95 °C, the temperature of a feed inlet was set to be 50 °C, the mixed material was slowly poured into the twin-screw extruder and subjected to extrusion forming after the twin-screw extruder ran stably, and then the rice noodles were collected;

first-stage aging: the rice noodles were put into a constant temperature and humidity incubator with the temperature and humidity being respectively 50 °C and 98%, and aged for 1 h;

re-steaming: the re-steaming temperature was 100 °C, and the re-steaming time was 15 min;

second-stage aging: the re-steamed rice noodles were taken out, put into the constant temperature and humidity incubator with the temperature and humidity being respectively 50 °C and 98% again, and aged for 5 h;

rehydration: the rice noodles subjected to the second-stage aging were trimmed to a length of 25 cm, the rehydration temperature was 85 °C, the rehydration time was 4 min, and the water content of the rice noodles after rehydration was 57%;

(3) the fresh wet brown rice noodles were soaked in a pickling solution (prepared by dispersing lactic acid and sodium lactate in water) and then bagged, where the mass concentration of the lactic acid in the pickling solution was 2%, the mass concentration of the sodium lactate in the pickling solution was 1%, and the pickling time was 2 min; at the same time, 6 mL of 75% edible ethanol solution was sprayed inside a packaging bag, and then the air in the bag was exhausted and the bag was sealed;

(4) the bagged fresh wet brown rice noodles were thermodynamically sterilized for 7 min at 85 °C and then put in cold water for cooling, and whether the packaging bag was subjected to air leakage or not was checked.

The preparation of the highly water-soluble starch-dextrin complex was the same as that in Example 1.

Comparative Example 1

The difference from Example 1 was that pyrophosphate, glycerol, and sodium chloride were not added.

The specific preparation process includes the following steps:

(1) ε-polylysine hydrochloride, a highly water-soluble starch-dextrin complex and water were mixed with white rice flour, and the mixture was evenly stirred, where the amounts of the ε-polylysine hydrochloride, the highly water-soluble starch-dextrin complex, and the water were respectively 0.1 g/kg, 5 g/kg, and 10 g/kg of the weight of the white rice flour, so that a mixed material was obtained;

(2) same as Example 1;

(3) same as Example 1;

(4) same as Example 1.

The preparation of the highly water-soluble starch-dextrin complex was the same as that in Example 1.

Comparative Example 2

The difference from Example 1 was that a highly water-soluble starch-dextrin complex was not added.

The specific preparation process includes the following steps:

(1) ε-polylysine hydrochloride, pyrophosphate, glycerol, sodium chloride, and water were mixed with white rice flour, and the mixture was evenly stirred, where the amounts of the ε-polylysine hydrochloride, the pyrophosphate, the glycerol, the sodium chloride, and the water were respectively 0.1 g/kg, 2 g/kg, 0.5 g/kg, 3 g/kg, and 10 g/kg of the weight of the white rice flour, so that a mixed material was obtained;

(2) same as Example 1;

(3) same as Example 1;

(4) same as Example 1.

Comparative Example 3

The difference from Example 1 was that ε-polylysine hydrochloride was not added.

The specific preparation process includes the following steps:

(1) four materials including pyrophosphate, glycerol, sodium chloride and a highly water-soluble starch-dextrin complex as well as water were mixed with white rice flour, and the mixture was evenly stirred, where the amounts of the pyrophosphate, the glycerol, the sodium chloride, the highly water-soluble starch-dextrin complex, and the water were respectively 0.1 g/kg, 2 g/kg, 0.5 g/kg, 5 g/kg, and 10 g/kg of the weight of the white rice flour, so that a mixed material was obtained;

(2) same as Example 1;

(3) same as Example 1;

(4) same as Example 1.

The preparation of the highly water-soluble starch-dextrin complex was the same as that in Example 1.

Comparative Example 4

The difference from Example 1 was that the concentration of a pickling solution was low.

The specific preparation process includes the following steps:

(1) same as Example 1;

(2) same as Example 1;

(3) the fresh wet rice noodles were soaked in a pickling solution (the mass concentration of lactic acid in the pickling solution was 0.5%, and the mass concentration of sodium lactate in the pickling solution was 1%) and then bagged, where the pickling time was 2 min; at the same time, 5 mL of 65% edible ethanol solution was sprayed inside a packaging bag, and then the air in the bag was exhausted and the bag was sealed; and (4) the bagged fresh wet rice noodles were thermodynamically sterilized for 15 min at 75 °C and then put in cold water for cooling, and whether the packaging bag was subjected to air leakage or not was checked.

The preparation of the highly water-soluble starch-dextrin complex was the same as that in Example 1.

Comparative Example 5

The difference from Example 1 was that there was no spraying of an edible ethanol solution.

The specific preparation process includes the following steps:

(1) same as Example 1;

(2) same as Example 1;

(3) the fresh wet rice noodles were soaked in a pickling solution and then bagged, where the mass concentration of lactic acid in the pickling solution was 1%, the mass concentration of the sodium lactate in the pickling solution was 1%, and the pickling time was 2 min;

(4) same as Example 1.

The preparation of the highly water-soluble starch-dextrin complex was the same as that in Example 1.

Comparative Example 6

The difference from Example 2 lied in the absence of thermodynamic sterilization.

(1) Same as Example 2;

(2) same as Example 2; and (3) the fresh wet brown rice noodles were soaked in a pickling solution and then bagged, where the mass concentration of the lactic acid in the pickling solution was 1.5%, the mass concentration of the sodium lactate in the pickling solution was 1%, and the pickling time was 2 min, and at the same time, 5 mL of 75% edible ethanol solution was sprayed inside a packaging bag, and then the air in the bag was exhausted and the bag was sealed.

The preparation of the highly water-soluble starch-dextrin complex was the same as that in Example 1.

Comparative Example 7

The difference from Example 1 was that the preservation treatment was not carried out.

(1) Extrusion forming, first-stage aging, re-steaming, second-stage aging and rehydration were performed on white rice flour to obtain fresh wet rice noodles, where the extrusion forming: the gelatinization temperature of a twin-screw extruder was set to be 95 °C, the temperature of a feed inlet was set to be 50 °C, the mixed material was slowly poured into the twin-screw extruder and subjected to extrusion forming after the twin-screw extruder ran stably, and then the rice noodles were collected;

first-stage aging: the rice noodles were put into a constant temperature and humidity incubator with the temperature and humidity being respectively 50 °C and 98%, and aged for 1 h;

re-steaming: the re-steaming temperature was 100 °C, and the re-steaming time was 15 min;

second-stage aging: the re-steamed rice noodles were taken out, put into the constant temperature and humidity incubator with the temperature and humidity being respectively 50 °C and 98% again, and aged for 5 h;

rehydration: the rice noodles subjected to the second-stage aging were trimmed to a length of 25 cm, the rehydration temperature was 85 °C, the rehydration time was 4 min, and the water content of the brown rice noodles after rehydration was 57%;

(2) the fresh wet rice noodles were bagged for storage.

The quality results of fresh wet rice noodles (or fresh wet brown rice noodles) obtained from Examples 1-3 and Comparative Examples 1-7 are shown in Tables 1 and 2.

TABLE 1

| | Hygienic indexes of fresh wet rice noodles stored at 25° C. for 60 days | |
|---|---|---|
| | Total plate count (CFU/g) | Total number of mold colonies (CFU/g) |
| Example 1 | 1300 | 50 |
| Example 2 | 1250 | 55 |
| Example 3 | 1330 | 40 |
| Comparative Example 1 | 1450 | 43 |
| Comparative Example 2 | 1320 | 60 |
| Comparative Example 3 | 1930 | 110 |
| Comparative Example 4 | 9300 | 180 |
| Comparative Example 5 | 21000 | 420 |
| Comparative Example 6 | 38000 | 1050 |
| Comparative Example 7 | Countless (>$10^8$) | Countless |

TABLE 2

| | Physicochemical indexes of fresh wet rice noodles stored at 25° C. for 60 days | | |
|---|---|---|---|
| | Water loss rate (%) | Hardness (g) | Breaking rate (%) |
| Example 1 | 4.25 | 720 | 6.32 |
| Example 2 | 4.37 | 712 | 3.33 |
| Example 3 | 4.10 | 735 | 3.33 |
| Comparative Example 1 | 13.32 | 950 | 12.89 |
| Comparative Example 2 | 15.30 | 830 | 15.33 |
| Comparative Example 3 | 5.03 | 743 | 6.33 |
| Comparative Example 4 | 5.10 | 630 | 12.89 |
| Comparative Example 5 | 4.93 | 599 | 23.33 |
| Comparative Example 6 | 4.43 | 586 | 20.00 |
| Comparative Example 7 | 16.53 | Not detected (The sample cannot be tested) | Not detected (The sample cannot be tested) |

As can be seen from the above test results, the preservation technology provided by the present disclosure can effectively inhibit the microbial proliferation and water loss of the fresh wet rice noodles (or fresh wet brown rice noodles), has a good preservation effect, and can ensure the microbial indexes to be within a safe range within 2 months.

Furthermore, after the preservation technology is applied, the breaking rate and hardness of the fresh wet rice noodles (or fresh wet brown rice noodles) can be effectively reduced during storage, and the rice noodles are enabled to have good water retention performance. To sum up, the preservation technology can effectively prolong the shelf life of the fresh wet rice noodles (or fresh wet brown rice noodles) to 2 months or more, maintain good quality of the rice noodles, and allow the rice noodles to have better water retention performance and anti-regeneration performance.

Example 4

(1) Optimization of an adding method for ε-polylysine hydrochloride during the preservation of fresh wet rice noodles The influence of adding and soaking methods on the preservation effect Referring to Example 1, the difference lied in:

Adding method: 0.5 g/kg, 1.0 g/kg and 1.5 g/kg of ε-polylysine hydrochloride aqueous solutions were respectively prepared and added to white rice flour in a humidity control process.

Soaking method: ε-polylysine hydrochloride aqueous solutions with concentrations of 0.5%, 1.0% and 1% were respectively prepared, and the prepared fresh wet rice noodles were respectively soaked in the above solutions for 2 min and then bagged and sealed.

Thermodynamic sterilization and ethanol spraying were not carried out.

Comparing the effects of the above two methods on the quality of fresh wet rice noodles: it can be seen from FIG. 1 that the antibacterial effect of the adding process is significantly higher than that of the soaking process, and when the addition amount of E-polylysine hydrochloride is 1.0 g/kg to 1.5 g/kg, the antibacterial effect is the best.

Figure 2:
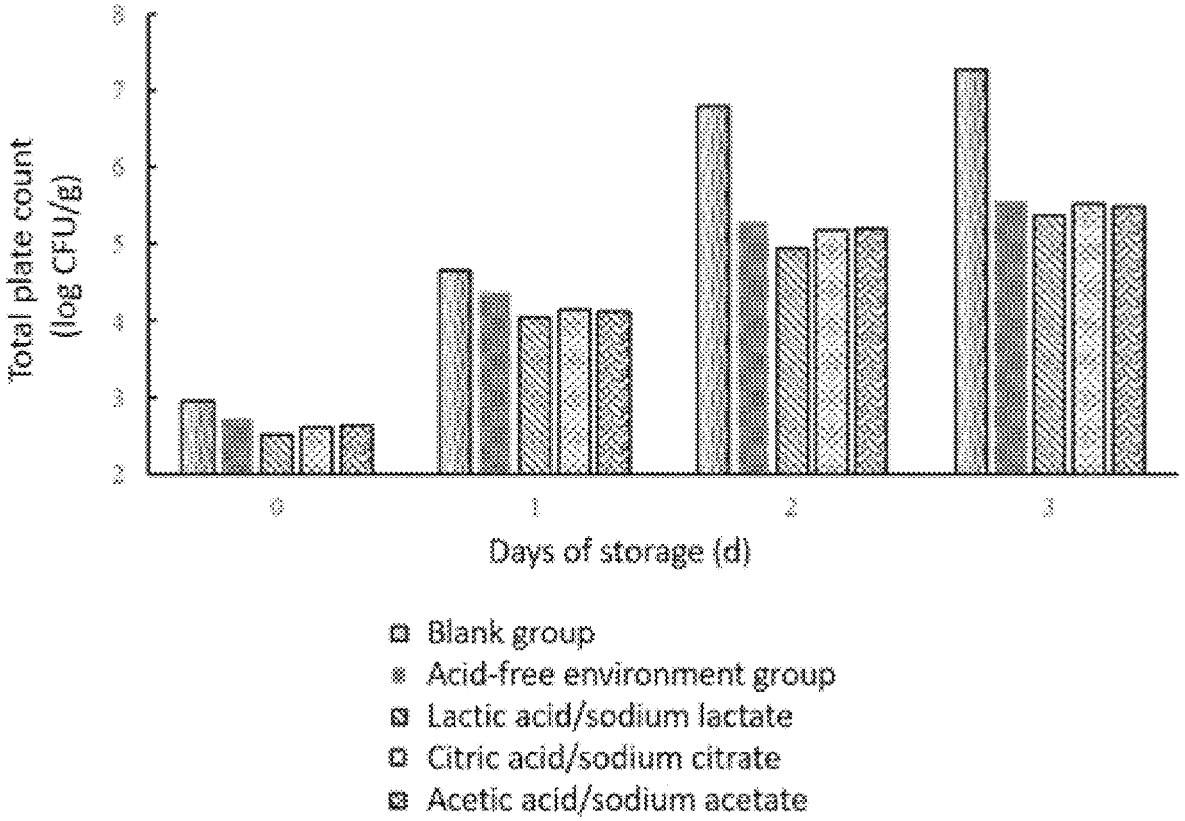
FIG. 2 is a comparison diagram of the bacteriostatic effects of ε-polylysine hydrochloride in different acidic systems.

(2) The effect of ε-polylysine hydrochloride combined with slightly acidic buffer system on the preservation of rice noodles ① Effects of different types of acid systems on the antibacterial effect of E-polylysine hydrochloride Referring to Example 1, the difference lied in that: a lactic acid/sodium lactate aqueous solution (1 g/100 g of lactic acid, 1 g/100 g of sodium lactate), a citric acid/sodium citrate aqueous solution (1 g/100 g of citric acid, 1 g/100 g of sodium citrate), and an/a acetic acid/sodium acetate aqueous solution (1 g/100 g of acetic acid, 1 g/100 g of sodium acetate) were respectively prepared; and fresh wet rice noodles (or fresh wet brown rice noodles) added with 1 g/kg of ε-polylysine hydrochloride were respectively soaked in the above solutions for 2 min, and quickly bagged and sealed without thermodynamic sterilization and ethanol spraying. The effects of the above different acid systems on the antibacterial effect of ε-polylysine hydrochloride were compared, as shown in FIG. 2 and Table 3. As can be seen from FIG. 2, in the lactic acid/sodium lactate acid system, the antibacterial effect of the ε-polylysine hydrochloride is the best. In addition, through sensory evaluation, it is found that the flavor of the lactic acid/sodium lactate system has the least impact on the flavor of the rice noodles compared to the other acid systems.

TABLE 3

Effects of different acid systems on the taste of fresh wet rice noodles

| Treatment condition | Blank group | Acid-free environment group | Lactic acid/ sodium lactate | Citric acid/ sodium citrate | Acetic acid/ sodium acetate |
|---|---|---|---|---|---|
| Sensory score | 78.32 ± 2.66 | 78.15 ± 3.12 | 77.43 ± 2.07 | 72.59 ± 3.25 | 74.71 ± 1.91 |

Figure 3:
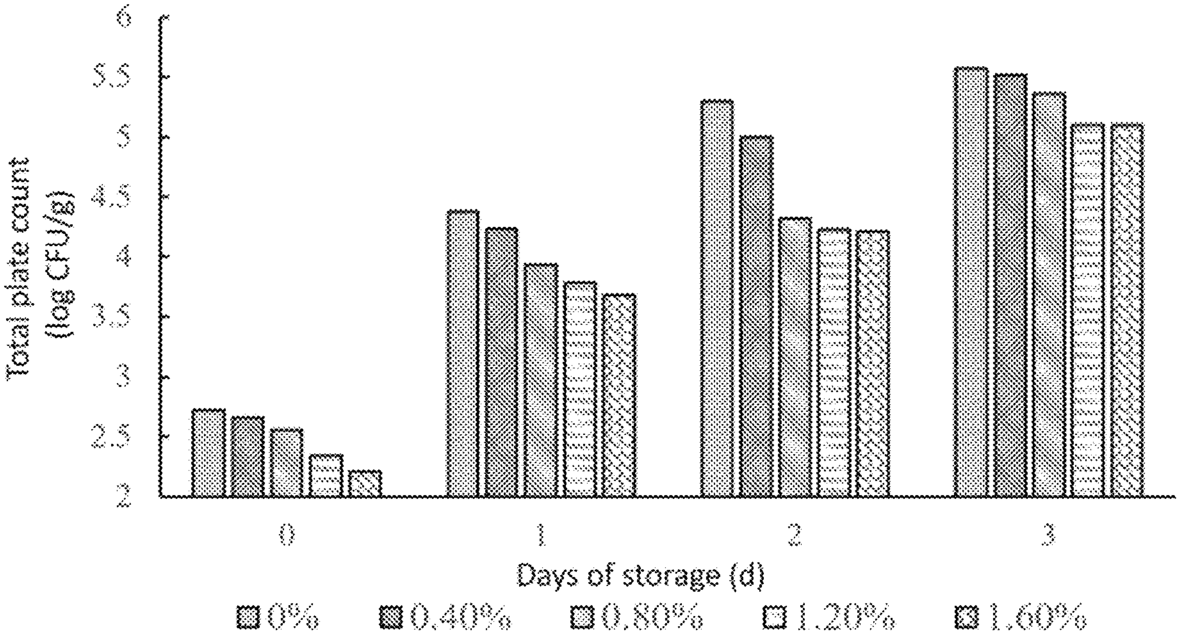
FIG. 3 is a comparison diagram of the bacteriostatic effects of lactic acid with different concentrations on ε-polylysine hydrochloride.

② Effects of lactic acid/sodium lactate systems with different concentrations on the antibacterial effect of ε-polylysine hydrochloride Referring to Example 1, the difference lied in that: four types of lactic acid solutions with mass fractions of 0.4%, 0.8%, 1.2%, and 1.6% were selected as pickle liquors, and 1 g/100 g of sodium lactate was added to each of the four types of pickle liquors to construct a lactic acid/sodium lactate system. Fresh wet rice noodles added with 1 g/kg of ε-polylysine hydrochloride were respectively soaked in the above solutions for 2 min, and quickly bagged and sealed without thermodynamic sterilization and ethanol spraying. The effects of the above four types of acid systems with different concentrations on the quality of the fresh wet rice noodles were compared. As shown in FIG. 3, when the content of sodium lactate is 1 g/100 g, and the concentration of lactic acid is 1.2% and 1.6%, the antibacterial effect is better.

Example 5

(1) Effects of highly water-soluble starch-dextrin complexes obtained at different treatment times on the quality of fresh wet rice noodles The preparation of highly water-soluble starch-dextrin complexes: with reference to Example 1, only the baking time was selected as 1 h, 2 h, 3 h, 4 h, and 5 h, respectively, so as to obtain the corresponding highly water-soluble starch-dextrin complexes.

The sterilizing preservation method in Example 1 was adopted without adding water retaining agents such as pyrophosphate and glycerol, and 50 g/kg (calculated by rice flour) of the highly water-soluble starch dextrin complex was selected to obtain the corresponding fresh wet rice noodles.

The effects of the highly water-soluble starch-dextrin complexes obtained by baking for different periods of time on the quality of the fresh wet rice noodles were compared, and the fresh wet rice noodles were compared with commercially available rice noodles (added with corn starch without special treatment). The specific results are as shown in Table 4.

TABLE 4

Physicochemical indexes after 60 days of storage at 25° C.

| | Powder properties | | Quality of rice noodles | | |
|---|---|---|---|---|---|
| Baking time (h) | Brightness (L*) | Solubility (%) | Water loss rate (%) | Hardness (g) | Breaking rate (%) |
| 0 | 107.58 | 1.54 | 15.48 | 924 | 15.00 |
| 1 | 103.87 | 74.25 | 10.54 | 847 | 12.89 |
| 2 | 100.13 | 98.14 | 9.74 | 745 | 8.33 |
| 3 | 98.18 | 98.52 | 7.01 | 741 | 6.33 |

TABLE 4-continued

| Physicochemical indexes after 60 days of storage at 25° C. | | | | | |
|---|---|---|---|---|---|
| | Powder properties | | Quality of rice noodles | | |
| Baking time (h) | Brightness (L*) | Solubility (%) | Water loss rate (%) | Hardness (g) | Breaking rate (%) |
| 4 | 97.03 | 99.47 | 6.26 | 720 | 3.33 |
| 5 | 89.91 | 99.49 | 5.81 | 731 | 3.33 |

It can be seen from Table 4 that with the increase of baking time, the color of the highly water-soluble starch-dextrin complex gradually deepens and the solubility increases rapidly. After 2 h of baking time, the solubility reaches up to 98% or above. Compared with the commercially available rice noodles, the rice noodles prepared from the highly water-soluble starch-dextrin complex baked for more than 4 h have the best anti-aging effect.

(2) Effects of highly water-soluble starch-dextrin complexes obtained under different pH conditions on the quality of fresh wet rice noodles The preparation of highly water-soluble starch-dextrin complexes: with reference to Example 1, only the pH was selected as 2.5, 3, and 3.5, respectively, so as to obtain the corresponding highly water-soluble starch-dextrin complexes.

The sterilizing preservation method in Example 1 was adopted without adding water retaining agents such as pyrophosphate and glycerol, and the highly water-soluble starch-dextrin complexes were prepared by selecting the corresponding pH of 2.5, 3, and 3.5. The effects of the highly water-soluble starch-dextrin complexes obtained under the different pH conditions on the quality of fresh wet rice noodles were compared. The specific results are as shown in Table 5.

TABLE 5

| Physicochemical indexes after 60 days of storage at 25° C. | | | | | |
|---|---|---|---|---|---|
| | Powder properties | | Quality of rice noodles | | |
| pH | Brightness (L*) | Solubility (%) | Water loss rate (%) | Hardness (g) | Breaking rate (%) |
| 2.5 | 89.12 | 99.41 | 6.18 | 735 | 3.33 |
| 3 | 97.48 | 99.47 | 6.14 | 738 | 3.33 |
| 3.5 | 97.87 | 98.84 | 6.58 | 765 | 5.00 |

It can be seen from Table 5 that the brightness of the highly water-soluble starch-dextrin complex is basically unchanged when pH is 3 or 3.5, and the solubility is maximum when pH is 2.5 or 3. High solubility is conducive to the dispersion of an anti-aging agent in rice noodles, which improves the anti-aging effect. After comprehensive consideration, the highly water-soluble starch-dextrin complex prepared when pH is 3 is selected for use.

(3) Effects of addition amounts of highly water-soluble starch-dextrin complexes on the quality of fresh wet rice noodles The sterilizing preservation method in Example 1 was adopted without adding water retaining agents such as pyrophosphate and glycerol, and 30 g/kg, 60 g/kg, 90 g/kg and 120 g/kg of highly water-soluble starch-dextrin complexes (rice flour base) were respectively added. The effects of the highly water-soluble starch-dextrin complexes obtained under the different pH conditions on the quality of fresh wet rice noodles were compared. The specific results are as shown in Table 6 and Table 7.

TABLE 6

| Physicochemical indexes after 60 days of storage at 25° C. | | | |
|---|---|---|---|
| Addition amount (g/kg) | Water loss rate (%) | Hardness (g) | Breaking rate (%) |
| 30 | 8.15 | 845 | 6.32 |
| 60 | 6.01 | 784 | 3.33 |
| 90 | 5.11 | 725 | 3.33 |
| 120 | 4.41 | 711 | 1.67 |

TABLE 7

| Effects of different addition amounts on the taste of fresh wet rice noodles | | | | | |
|---|---|---|---|---|---|
| | Addition amount (g/kg) | | | | |
| | 0 | 30 | 60 | 90 | 120 |
| Sensory score | 78.32 ± 2.66 | 79.11 ± 2.22 | 78.56 ± 3.24 | 73.48 ± 1.78 | 71.74 ± 2.58 |

It can be seen from Table 6 that the anti-aging effect of the highly water-soluble starch-dextrin complex with high addition amount on rice noodles is better than that of the highly water-soluble starch-dextrin complex with low addition amount. According to the sensory evaluation scores in Table 7, it can be seen that the highly water-soluble starch-dextrin complex with low addition amount has a certain promoting effect on the taste of the rice noodles, while the highly water-soluble starch-dextrin complex with high addition amount can worsen the flavor of the rice noodles. After comprehensive consideration, adding 60 g/kg of the highly water-soluble starch-dextrin complex has the best effect on improving the quality of the rice noodles.

What is claimed is:

1. A method for preservation of fresh wet rice noodles or fresh wet brown rice noodles, which comprises:

(a) mixing ε-polylysine hydrochloride, pyrophosphate, glycerol, sodium chloride, a highly water-soluble starch-dextrin complex, rice flour, and water, to obtain a mixed system, wherein the rice flour comprises white rice flour or brown rice flour;

(b) extrusion forming, first-stage aging, steaming at 100 °C, second-stage aging, and rehydrating the mixed system to obtain the fresh wet rice noodles or the fresh wet brown rice noodles;

(c) soaking the fresh wet rice noodles or the fresh wet brown rice noodles in a preservation solution, (d) bagging the fresh wet rice noodles or the fresh wet brown rice noodles from step (c) in a packaging bag, (e) spraying an edible ethanol solution inside the packaging bag, and then exhausting air from the packaging bag and sealing the packaging bag to obtain packaged fresh wet rice noodles or packaged fresh wet brown rice noodles;

(f) thermodynamically sterilizing the packaged fresh wet rice noodles or the packaged fresh wet brown rice noodles at a temperature of 75 °C to 85 °C for 10 to 15 minutes, then soaking the thermodynamically sterilized packaged fresh wet rice noodles or the packaged fresh wet brown rice noodles in cold water, and checking whether the packaging bag is leaking air;

wherein the amounts of the ε-polylysine hydrochloride, the pyrophosphate, the glycerol, the sodium chloride, and the highly water-soluble starch-dextrin complex being respectively, 0.1 g/kg to 0.2 g/kg, 2 g/kg to 3 g/kg, 0.5 g/kg to 1 g/kg, 2 g/kg to 3 g/kg, and 5 g/kg to 120 g/kg of the weight of the rice flour;

wherein a mass concentration of the edible ethanol is 65% to 85%;

wherein the preservation solution is a lactic acid/sodium lactate composite solution, in which a mass concentration of lactic acid is 1% to 2%, and that of sodium lactate is 1%; and wherein the highly water-soluble starch-dextrin complex is prepared by:

mixing corn starch with water in a ratio of 1:1.3 to 1:1.6 to create a mixture, adding lactic acid to the mixture to adjust the pH of the mixture to 2.8 to 3.2, continuously stirring the mixture for 30 minutes, filtering the mixture with suction and then heating the mixture at 40 °C thereby reducing the water content in the mixture to 5%, and heating the mixture at 180 °C for 3 to 5 hours, thereby preparing the highly water-soluble starch-dextrin complex.

2. The method according to claim 1, wherein:

the highly water-soluble starch-dextrin complex possesses a solubility of higher than 95%, a molecular weight of the highly water-soluble starch-dextrin complex is $2.5\times10^5$ g/mol to $3.5\times10^5$ g/mol, and the viscosity of the highly water-soluble starch-dextrin complex is 40 mPa·s to 50 mPa·s.

3. The method according to claim 1, wherein the steaming time is 10 to 15 minutes.

4. The method according to claim 1, wherein the rehydrated fresh wet rice noodles or the rehydrated fresh wet brown rice noodles possess a water content of from 60 to 65%.

5. The method according to claim 1, wherein:

the fresh wet rice noodles or the fresh wet brown rice noodles are soaked in the preservation solution for 2 to 3 minutes, and the rice noodles are packed into each bag in an amount of 200 g/bag to 300 g/bag.

6. The method according to claim 1, wherein:

the edible mass concentration is 65%-85%, and the sprayed ethanol solution per bag is 5 to 6 mL.

* * * * *